US012661963B2

(12) United States Patent (10) Patent No.: US 12,661,963 B2
Yang et al. (45) Date of Patent: Jun. 23, 2026

(54) CLOAK BRACKET FOR REAR BUCKET OF PICKUP TRUCK

(71) Applicant: GUANGZHOU ISSYZONE TECHNOLOGY CO., LIMITED, Guangzhou (CN)

(72) Inventors: Taiping Yang, Shenzhen (CN); Huanzhi Gong, Yulin (CN); Zhifeng Zhu, Yizhou (CN); Jianwen Xiao, Ganzhou (CN)

(73) Assignee: GUANGZHOU ISSYZONE TECHNOLOGY CO., LIMITED, Guangzhou (CN)

( * ) Notice: Subject to any disclaimer, the term of this patent is extended or adjusted under 35 U.S.C. 154(b) by 328 days.

(21) Appl. No.: 18/404,149

(22) Filed: Jan. 4, 2024

(65) Prior Publication Data

US 2025/0144985 A1 May 8, 2025

(30) Foreign Application Priority Data

Nov. 8, 2023 (CN) .......................... 202311480928.X

(51) Int. Cl.
 B60J 7/00 (2006.01)
 B60J 7/10 (2006.01)
(52) U.S. Cl.
 CPC ..................................... B60J 7/102 (2013.01)
(58) Field of Classification Search
 CPC ..... B60J 7/10; B60J 7/102; B60J 7/104; B60J 7/1291; B60J 7/141

USPC ...................................................... 296/100.17
 See application file for complete search history.

(56) References Cited

U.S. PATENT DOCUMENTS

| 6,227,592 B1 * | 5/2001 | Thacker | ................. | B60J 7/1614 |
| | | | | 296/100.1 |
| 6,439,646 B1 * | 8/2002 | Cornelius | ................ | B60J 7/102 |
| | | | | 296/105 |
| 8,322,779 B2 * | 12/2012 | Kramer | ...................... | B60J 7/11 |
| | | | | 296/185.1 |
| 9,580,004 B2 * | 2/2017 | Puchkoff | ................... | B60P 7/14 |
| 2012/0098292 A1 * | 4/2012 | Huotari | ...................... | B60J 7/10 |
| | | | | 296/100.09 |

* cited by examiner

*Primary Examiner* — Steven O Douglas
(74) *Attorney, Agent, or Firm* — Birchwood IP

(57) ABSTRACT

The present disclosure discloses a cloak bracket for rear bucket of pickup truck including fixed crossbars that are symmetrically provided on a left inner side and a right inner side of the rear bucket. Two fixed crossbars are provided with a first hinge member and a second hinge member on a side of the fixed crossbars along a length direction thereof, respectively. Two second hinge members are hinged with two tail ends of a first arched support bracket, respectively; middle sections on two sides of the first arched support bracket are hinged with a head end of a support arm, respectively; a tail end of the support arm is detachably hinged with the first hinge member. The beneficial effect of the present disclosure is that a detachable characteristic of the support arm can be used to quickly detach the support arm from the first hinge member.

11 Claims, 6 Drawing Sheets

CLOAK BRACKET FOR REAR BUCKET OF PICKUP TRUCK

CROSS-REFERENCE TO RELATED APPLICATIONS

This application claims priority to Chinese Patent Application No. 202311480928.X, filed on Nov. 8, 2023, which is hereby incorporated by reference in its entirety.

TECHNICAL FIELD

The present disclosure relates to the field of cloak technologies, and in particular, to a cloak bracket for rear bucket of pickup truck.

BACKGROUND

A pickup truck is a lightweight truck with a roofless cargo box (i.e., a rear bucket) located behind the driver's cab, and the side panels of the cargo box are connected to the driver's cab. Due to its large cargo capacity, it is highly favored by outdoor enthusiasts in the market. However, due to the fact that the cargo boxes of pickup trucks are not covered by the roof, they are not suitable for carrying goods in rainy days. Therefore, rear cloaks for pickup truck and corresponding installation brackets have been gradually introduced on the market. For example, a Chinese Utility Model Patent of CN201457210U discloses a truck rain shelter, which is equipped with a cloth storage cylinder at the front guard of the truck. When in use, the rain shelter is stretched towards the rear of the truck and fixed on the support rod to obtain a closed shed. By adopting this structure, the installation and disassembly of the rain shelter are relatively simple, and the space occupied by the rain shelter after being folded up is very small.

However, the disassembly and storage process of the above truck rain shelter is still relatively cumbersome for outdoor users. The reason is that the longitudinal support rod needs to be fixed to the rear end of the vehicle through screws. When users do not need a cloak, multiple bolts need to be removed to remove the longitudinal support rod from the rear end of the vehicle, which is time-consuming and labor-intensive.

SUMMARY

In view of the above issues, the present disclosure proposes a cloak bracket for rear bucket of pickup truck, which mainly solves the problem of inconvenient disassembly caused by the use of multiple bolts to fix the existing support rod of rear bucket for pickup truck.

To solve the above technical problems, the technical solution of the present disclosure is as follows.

A cloak bracket for rear bucket of pickup truck, including fixed crossbars that are symmetrically provided on a left inner side and a right inner side of the rear bucket, two fixed crossbars are provided with a first hinge member and a second hinge member on a side of the fixed crossbars along a length direction thereof, respectively; two second hinge members are hinged with two tail ends of a first arched support bracket, respectively; middle sections on two sides of the first arched support bracket are hinged with a head end of a support arm, respectively; a tail end of the support arm is detachably hinged with the first hinge member.

In some embodiments, the cloak bracket for rear bucket of pickup truck further includes a third hinge member provided on a side of the fixed crossbars, and the first hinge member, the second hinge member, and the third hinge member are arranged sequentially from a tail end to a head end of the rear bucket; two third hinge members are hinged with two tail ends of a third arched support bracket, respectively; two tail ends of the first arched support are extended and hinged with two tail ends of a second arched support bracket; and middle sections on two sides of the second arched support bracket are hinged with middle sections on two sides of the third arched support bracket, respectively.

In some embodiments, the first arched support bracket, the second arched support bracket, or the third arched support bracket includes a support crossbar and a support diagonal bar that is detachable arranged at two ends of the support crossbar.

In some embodiments, the first arched support bracket, the second arched support bracket, and the third arched support bracket include a support crossbar and a support diagonal bar that is detachable arranged at two ends of the support crossbar.

In some embodiments, after a tail end of the support arm is detachably hinged with the first hinge member, vertical heights of the support crossbars corresponding to the first arched support bracket, the second arched support bracket, and the third arched support bracket are equal.

In some embodiments, an axis of the first hinge member is provided with a bolt, a tail end of the support arm is provided with a hook for fastening the bolt, an opening of the hook faces downwards, a hand twisted part is screwed into the bolt to tighten the hook.

In some embodiments, the cloak bracket for rear bucket of pickup truck further includes a cloak, two sides of the cloak are provided with a fixed part, and a side of the fixed crossbars is provided with a fixed hole for accommodating the fixed part.

In some embodiments, the fixed part is a Velcro tape that is glued or sewn on two sides of the cloak.

In some embodiments, an inner lower end of the fixed crossbar is provided with a first fastener that matches a contour of a side wall of the rear bucket; an inner upper end of the fixed crossbar is provided with a second fastener that matches the first fastener, where a contact surface between the second fastener and the first fastener is provided with a first fastening piece.

In some embodiments, an end of the fixed crossbar close to a tail part thereof is further provided with a detachable rear crossbar.

In some embodiments, two ends of the tail crossbar are fixedly connected to a connection rod; a middle of the connection rod is provided with a slot hole along its own length direction; an inner side of the fixed crossbar is provided with a second fastening piece that matches a width of the slot hole.

The beneficial effect of the present disclosure is that by providing a first arched support bracket and a support arm that are mutually hinged on a fixed crossbar, when a user needs to disassemble the first arched support bracket, a detachable characteristic of the support arm can be used to quickly detach the support arm from the first hinge member. After losing the fixation of the first hinge member, the first arched support bracket can freely rotate the second hinge member as a rotation axis, and finally, the first arched support bracket collapses towards the ground due to its own weight, thereby achieving rapid disassembly of the first arched support bracket.

NUMERAL REFERENCE

Figure 1:
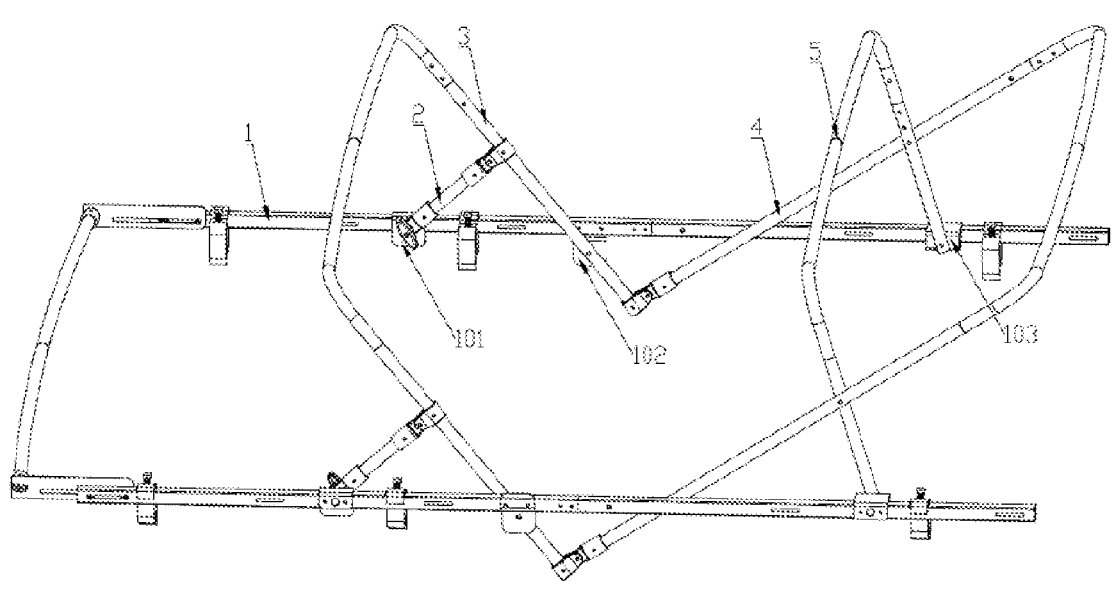
FIG. 1 is a first schematic diagram of an installation statue of a cloak bracket for rear bucket of pickup truck disclosed in an embodiment of the present disclosure.

1—fixed crossbar, 2—support arm, 3—first arched support bracket, 4—second arched support bracket, 5—third arched support bracket, 6—bolt, 7—hook, 8—hand twisted part, 9—fixed hole, 101—first hinge member, 102—second hinge member, 103—third hinge member, 104—first fastener, 105—second fastener, 106—first fastening piece, 107—tail crossbar, 108—connection rod, 109—slot hole, 110—second fastening piece, 111—cloak, 112—fixed part.

DESCRIPTION OF EMBODIMENTS

In order to make the purpose, technical solution, and advantages of the present disclosure clearer and definite, the content of the present disclosure will be further explained in detail in combination with the drawings and specific implementation modes. It can be understood that the specific embodiments described here are only used to explain the present disclosure and not to limit it. In addition, it should be noted that for the convenience of description, only some parts related to the present disclosure are shown in the drawings, rather than the entire content.

This embodiment provides a cloak bracket for rear bucket of pickup truck, as shown in FIG. 1, which includes fixed crossbars 1 that are symmetrically provided on a left inner side and a right inner side of the rear bucket. Two fixed crossbars 1 are provided with a first hinge member 101 and a second hinge member 102 on a side of the fixed crossbars along a length direction thereof. Two second hinge members 102 are hinged with two tail ends of a first arched support bracket 3, middle sections on two sides of the first arched support bracket 3 are respectively hinged with a head end of a support arm 2, a tail end of the support arm 2 is detachably hinged with the first hinge member 101.

In this embodiment, by providing the first arched support bracket 3 and support arm 2 that are mutually hinged on the fixed crossbar 1, when a user needs to disassemble the first arched support bracket 3, a detachable characteristic of the support arm 2 can be used to quickly detach the support arm 2 from the first hinge member 101. After losing the fixation of the first hinge member 101, the first arched support bracket 3 can freely rotate the second hinge member 102 as a rotation axis, and finally, the first arched support bracket 3 collapse towards the ground due to its own weight, thereby achieving rapid disassembly of the first arched support bracket 3.

Unless otherwise specified, all components in this embodiment are symmetrically arranged to ensure uniform structural strength.

Furthermore, for the truck rain shelter described in the background technology, only one horizontal support rod and a cloth storage cylinder actually provide actual support. The distance between the two support points is very large. If the rainfall is large, rainwater is easy to accumulate in the middle of the rain shelter. As time passes, the weight of the accumulated rainwater increases, eventually collapsing the rain shelter, causing items in the rear bucket to wade into the water. Therefore, in another implementation mode of this embodiment, a connection rod structure formed by hinging three arched support brackets is provided, as described below.

Figure 2:
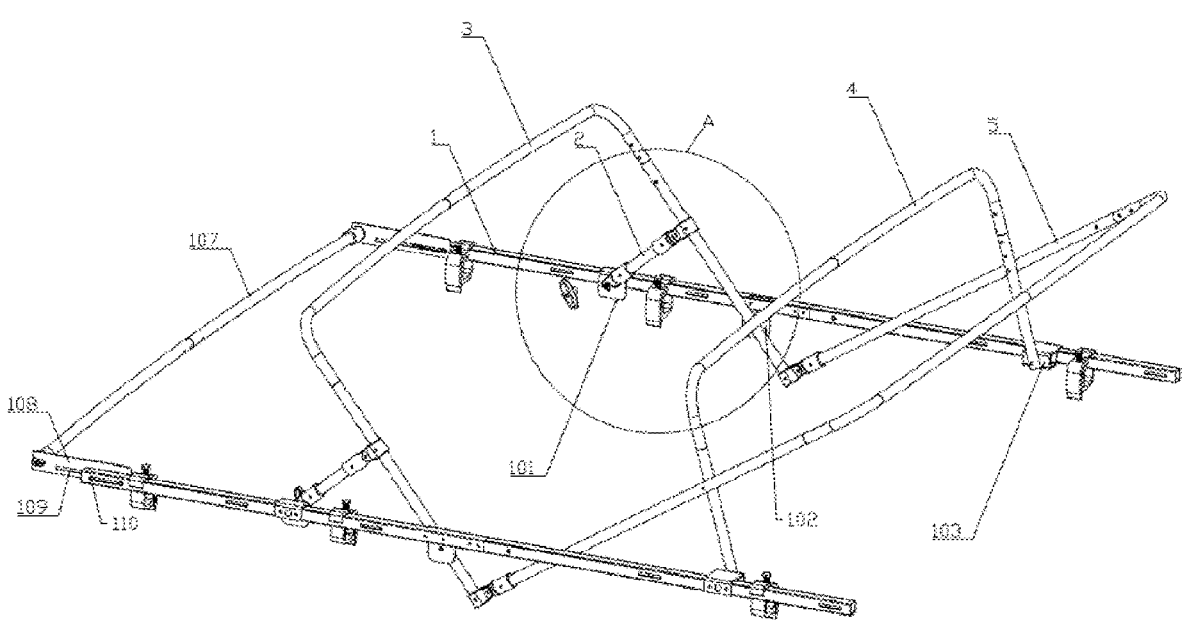
FIG. 2 is a state schematic diagram of the cloak bracket for rear bucket of pickup truck after removing a hook disclosed in an embodiment of the present disclosure.

Considering a limited length of the rear bucket, if three arched support brackets collapse in the same direction, there may cause interference, and causes any arched support bracket to not fully collapse due to some interference. Therefore, in this technical solution, as shown in FIGS. 1 and 2, a third hinge member 103 is also provided on a side of the fixed crossbar 1, and the first hinge member 101, second hinge member 102, and third hinge member 103 are arranged sequentially from a tail end to a head end of the rear bucket. Two third hinge member 103 are hinged with two tail ends of a third arched support bracket 5, two tail ends of the first arched support bracket 3 are extended and hinged with two tail ends of the second arched support bracket 4, middle sections on two sides of the second arched support bracket 4 are hinged with middle sections on two sides of the third arched support bracket 5. Finally, when the three arched support brackets are installed as shown in FIG. 1, the first arched support bracket 3 tilts towards a rear end of the vehicle, the second arched support bracket 4 tilts towards a front end of the vehicle, and the third arched support bracket 5 tilts towards the rear end of the vehicle. An entire connection rod structure is fixed by the support arm 2 and the first hinge member 101, and in a stable state. Therefore, the three arched support brackets can be used to support the cloak 111.

Figure 4:
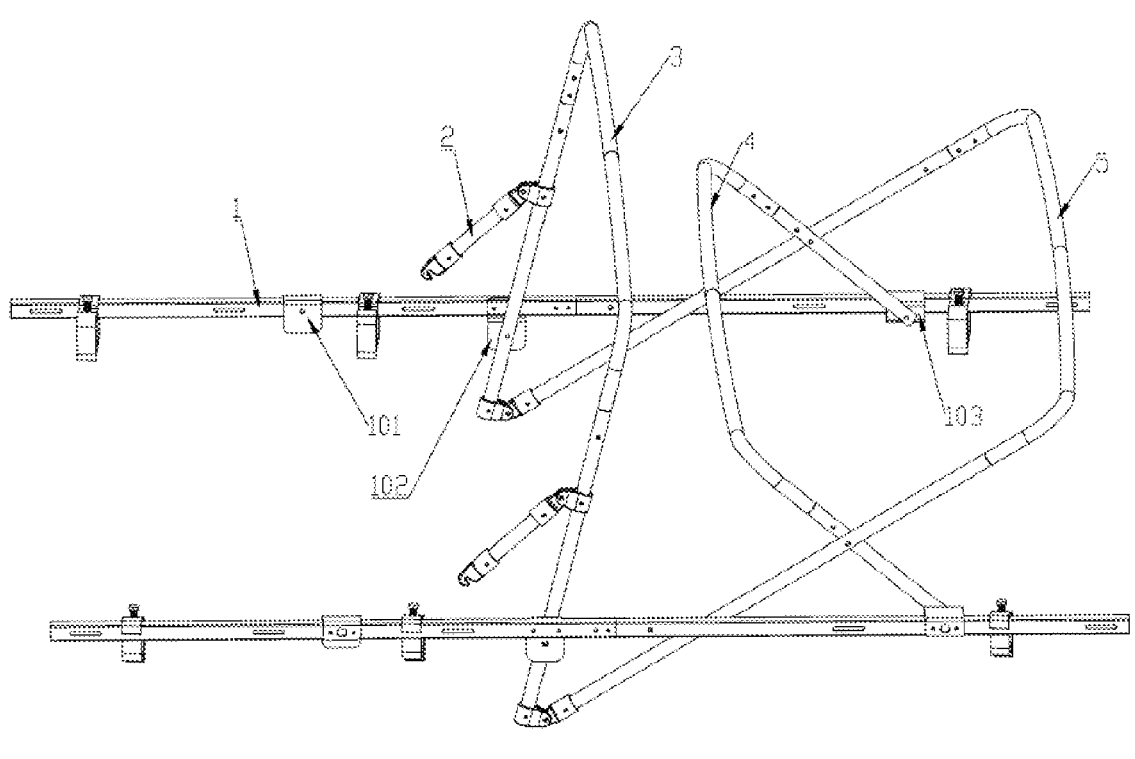
FIG. 4 is a schematic diagram of a folding process of the cloak bracket for rear bucket of pickup truck disclosed in an embodiment of the present disclosure.
Figure 5:
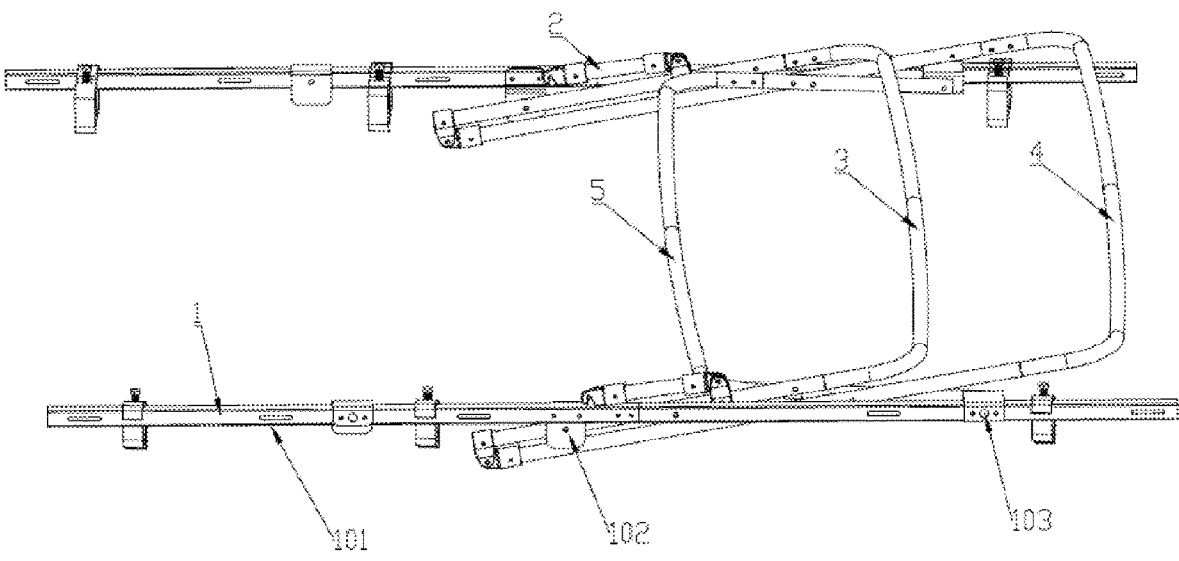
FIG. 5 is a schematic diagram of a disassembling completion status of the cloak bracket for rear bucket of pickup truck disclosed in an embodiment of the present disclosure.

In the above technical solution, the first hinge member 101, the second hinge member 102, and the third hinge member 103 are arranged sequentially from the tail end to the head end of the rear bucket, that is, the first arched support bracket 3, the second arched support bracket 4, and the third arched support bracket 5 corresponding to the three hinge members are also arranged sequentially from the tail end to the head end of the rear bucket, and most importantly, the tail end of the first arched support bracket 3 needs to be extended to be hinged with the tail end of the second arched support bracket 4, as shown in FIG. 4, when the first arched support bracket 3 loses the fixation of the support arm 2 and the first hinge member 101, the entire connection rod structure is in an extremely unstable state. Additionally, due to the hinge connection between the middle sections on two sides of the second arched support bracket 4 and the middle sections on two sides of the third arched support bracket 5, there is a strong tendency for the second arched support bracket 4 and the third arched support bracket 5 to self-collapse. At this time, the first arched support bracket 3 is pulled by other two arched support brackets; and thus, the first arched support bracket 3 has a tendency to collapse towards the front end of the vehicle. Therefore, the user only needs to apply a small push force on the first arced support bracket 3 towards the front end of the vehicle to drive the second arched support bracket 4 to naturally collapse towards the front end of the vehicle, and the third arched support bracket 5 to naturally collapse towards the rear end of the vehicle. After completing the disassembly task of the three arched supports, the final disassembly effect is shown in FIG. 5.

The above arched support brackets can be a non-closed-loop rigid component of any shape, which can achieve the function of supporting the cloak 111. Optionally, the first arched support bracket 3, the second arched support bracket 4, and/or the third arched support bracket 5 include a support crossbar and a support diagonal bar provided at two ends of the support crossbar. After the arched support bracket is removed, it can be further divided into support crossbars and support diagonal bars, and further compressing an occupied area of the arched support brackets.

Furthermore, considering that a top of the cloak 111 should be relatively flush, the three support crossbars should be in the same horizontal plane when installed. In an example, after the tail end of the support arm 2 is detachably hinged with the first hinge member 101, vertical heights of the support crossbars corresponding to the first arched support bracket 3, the second arched support bracket 4, and the third arched support bracket 5 are equal. Therefore, a length of the support diagonal bar should be adjusted adaptively. Specifically, in an installation state, the principle of consistent vertical heights of the support crossbars and an actual inclination angle of each support diagonal bar should be considered to set the actual length of each support diagonal rod, as an inclination angle of each support diagonal rod can be manually set, there are also various variations in the length of each support diagonal rod, which will not be listed here.

Figure 3:
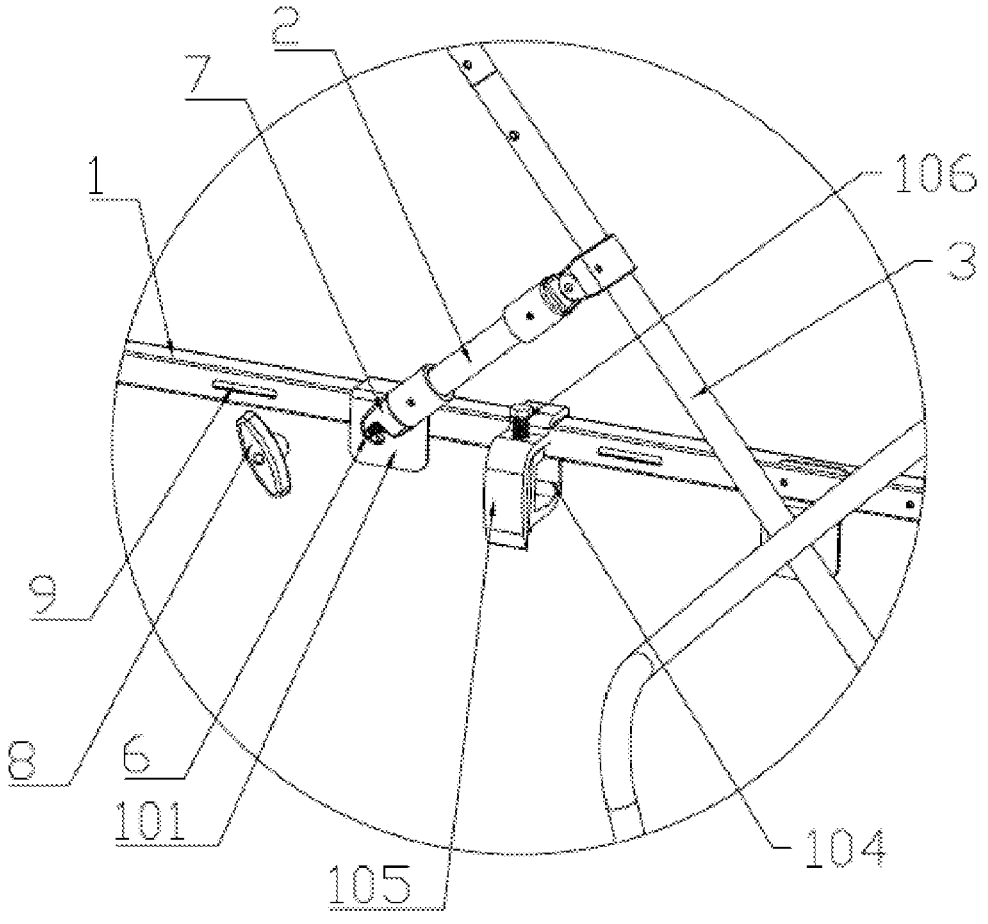
FIG. 3 is a partially enlarged view of part A in FIG. 1.

In this embodiment, the tail end of the support arm 2 should be detachably hinged with the first hinge member 101; and thus, providing users with a quick means of disassembly. In an example, as shown in FIG. 3, an axis of the first hinge member 101 is provided with a bolt 6, a tail end of the support arm 2 is provided with a hook 7 for fastening the bolt 6. An opening of the hook 7 faces downwards, a hand twisted part 8 is screwed into the bolt 6 to tighten the hook 7. In this technical solution, the bolt 6 is served as an axial extension part of the first hinge member 101, and the hook 7 provided at the tail end of the support arm 2 can quickly fasten the bolt 6; and thus, forming a preliminary radial limit. Due to the downward opening of the hook 7 and the gravity of the first arched support bracket 3 applied to the support arm 2, the hook 7 has a downward compression trend and is not easy to fall off. Finally, the hand twisted part 8 is used to screw the bolt 6 and tighten the hook 7, and thereby providing axial limit for the hook 7.

Figure 6:
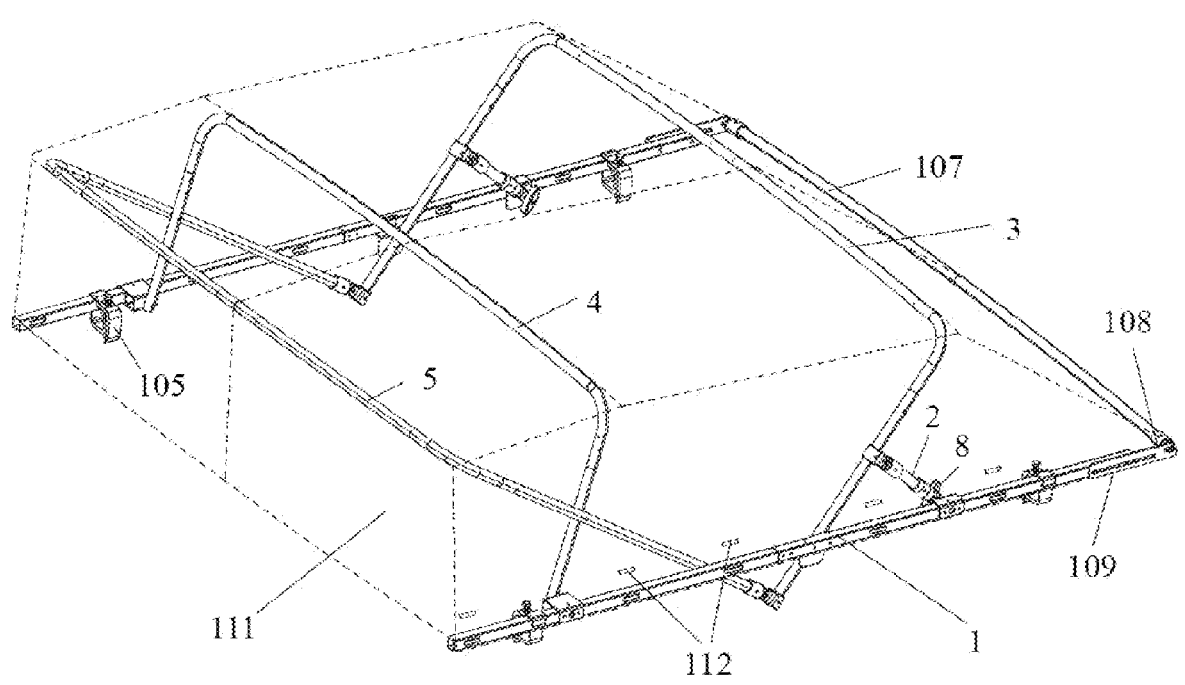
FIG. 6 is a second schematic diagram of the installation statue of the cloak bracket for rear bucket of pickup truck disclosed in an embodiment of the present disclosure.

The cloak bracket for rear bucket of pickup truck further includes a cloak 111 (shown in FIG. 6), which is provided with a fixed part 112 on two sides of the cloak 111 (shown in the FIG. 6). For example, the fixed part 112 can be a Velcro tape that is glued or sewn on two sides of the cloak 111. Continuing to refer to FIG. 3, a side of fixed crossbar 1 is provided with a fixed hole 9 for accommodating the fixed part 112. The Velcro tape passes through the fixed hole 9 and then fits together to fix the cloak 111 on two sides of the fixed crossbar 1.

In this embodiment, there is no limit to the fixing method between the fixed crossbar 1 and the rear bucket, which can be fixed either by permanent welding or by detachable means. In an example, continuing to refer to FIG. 3, an inner lower end of the fixed crossbar 1 is provided with a first fastener 104 for matching with a contour of a side wall of the rear bucket, and an inner upper end of the fixed crossbar 1 is provided with a second fastener 105 for matching with the first fastener 104. Where, a contact surface between the second fastener 105 and the first fastener 104 is provided with a first fastening piece 106. Generally speaking, there is a section steel on an inner edge of the rear bucket, which is used to strengthen the strength of the side wall of the rear bucket. Therefore, the first fastener 104 and second fastener 105 mentioned above should be set to adapt to the shape of the section steel to clamp it. Finally, the first fastening piece 106 is used to connect the first fastener 104 and the second fastener 105 to clamp the section steel, thereby forming a connection structure between the fixed crossbar 1 and the rear bucket. The first fastening piece 106 mentioned above can use a bolt, rivet, and other fasteners, in an implementation mode, a bolt is used for dismantling the fixed crossbar 1.

Due to the need to temporarily open the tail end of the cloak 111, a detachable tail crossbar 107 is further provided at an end of the fixed crossbar 1 close to the tail end of the rear bucket. Two ends of the tail crossbar 107 can be detachably installed at the tail end of the fixed crossbar 1. For example, the tail end of the fixed crossbar 1 can be provided with a groove facing the rear end of the vehicle (as shown in the drawing, not marked) to accommodate the end of the tail crossbar 107. At the same time, due to an elastic tension of the cloak 111, after the end of the tail crossbar 107 enters the groove, the tail crossbar 107 is stably fixed to the tail end of the crossbar 1. During installation, the tail crossbar 107 also needs to be fixed to the tail end of the cloak 111. Optionally, the tail end of the cloak 111 can be sewn into a hollow tube shape to accommodate the tail crossbar 107. When the user needs to open the tail end of the cloak 111, they can pull the tail crossbar 107 outward, and the end of the tail crossbar 107 will come out of the groove.

In this embodiment, it is necessary to use the elasticity of the cloak 111 to press the end of the tail crossbar 107 tightly in the groove, and the premise that the cloak 111 can provide elasticity is that it must be straightened, which means that the tail crossbar 107 has a need for expansion and contraction. Optionally, as shown in FIG. 2, two ends of the tail crossbar 107 are fixedly connected to a connection rod 108. A middle of the connection rod 108 is provided with a slot hole 109 along its own length direction, and a second fastening piece 110 is provided on an inner side of the fixed crossbar 1 that matches a width of the slot hole 109. A relative sliding of the second fastening piece 110 and the slot hole 109 controls the expansion and contraction of the tail crossbar 107. It should be noted that due to the slot hole 109 being in a long strip shape, if the second fastening piece 110 adopts a circular fastener such as a bolt, at least two bolts should be used to prevent slot hole 109 from rotating along one bolt. In this technical solution, the expansion and contraction amount of the tail crossbar 107 needs to be adjusted according to the straightness of the cloak 111 during the first installation.

The above embodiments are only intended to illustrate the technical concept and characteristics of the present disclosure, and their purpose is to enable ordinary technical personnel in the art to understand the content of the present disclosure and implement it accordingly, without limiting the protection scope of the present disclosure. Any equivalent changes or modifications made based on the essence of the present disclosure should be covered within the protection scope of the present disclosure.

What is claimed is:

1. A cloak bracket for rear bucket of pickup truck, comprising: fixed crossbars that are symmetrically provided on a left inner side and a right inner side of the rear bucket, two fixed crossbars are provided with a first hinge member and a second hinge member on a side of the fixed crossbars along a length direction thereof, respectively; two second hinge members are hinged with two tail ends of a first arched support bracket, respectively; middle sections on two sides of the first arched support bracket are hinged with a head end of a support arm, respectively; and a tail end of the support arm is detachably hinged with the first hinge member.

2. The cloak bracket for rear bucket of pickup truck according to claim 1, further comprising a third hinge member provided on a side of the fixed crossbars, and the first hinge member, the second hinge member, and the third hinge member are arranged sequentially from a tail end to a head end of the rear bucket; two third hinge members are hinged with two tail ends of a third arched support bracket, respectively; two tail ends of the first arched support are extended and hinged with two tail ends of a second arched support bracket; and middle sections on two sides of the second arched support bracket are hinged with middle sections on two sides of the third arched support bracket, respectively.

3. The cloak bracket for rear bucket of pickup truck according to claim 2, wherein the first arched support bracket, the second arched support bracket, and/or the third arched support bracket comprises a support crossbar and a support diagonal bar that is detachable arranged at two ends of the support crossbar.

4. The cloak bracket for rear bucket of pickup truck according to claim 2, wherein the first arched support bracket, the second arched support bracket, and the third arched support bracket comprise a support crossbar and a support diagonal bar that is detachable arranged at two ends of the support crossbar.

5. The cloak bracket for rear bucket of pickup truck according to claim 4, wherein after a tail end of the support arm is detachably hinged with the first hinge member, vertical heights of the support crossbars corresponding to the first arched support bracket, the second arched support bracket, and the third arched support bracket are equal.

6. The cloak bracket for rear bucket of pickup truck according to claim 1, wherein an axis of the first hinge member is provided with a bolt, a tail end of the support arm is provided with a hook for fastening the bolt, an opening of the hook faces downwards, and a hand twisted part is screwed into the bolt to tighten the hook.

7. The cloak bracket for rear bucket of pickup truck according to claim 1, further comprising a cloak, wherein two sides of the cloak are provided with a fixed part, and a side of the fixed crossbars is provided with a fixed hole for accommodating the fixed part.

8. The cloak bracket for rear bucket of pickup truck according to claim 7, wherein the fixed part is a Velcro tape that is glued or sewn on two sides of the cloak.

9. The cloak bracket for rear bucket of pickup truck according to claim 1, wherein an inner lower end of the fixed crossbar is provided with a first fastener that matches a contour of a side wall of the rear bucket; and an inner upper end of the fixed crossbar is provided with a second fastener that matches the first fastener, wherein a contact surface between the second fastener and the first fastener is provided with a first fastening piece.

10. The cloak bracket for rear bucket of pickup truck according to claim 1, wherein an end of the fixed crossbar close to a tail end thereof is further provided with a detachable rear crossbar.

11. The cloak bracket for rear bucket of pickup truck according to claim 9, wherein two ends of the tail crossbar are fixedly connected to a connection rod; and a middle of the connection rod is provided with a slot hole along its own length direction; an inner side of the fixed crossbar is provided with a second fastening piece that matches a width of the slot hole.

* * * * *